(12) United States Patent
Moulin

(10) Patent No.: US 6,762,786 B2
(45) Date of Patent: Jul. 13, 2004

(54) DEVICE FOR EXPOSING THERMOSENSITIVE MEDIA

(76) Inventor: Michel Moulin, Rue d'En Haut 16, CH-1143 Apples (CH)

( * ) Notice: Subject to any disclaimer, the term of this patent is extended or adjusted under 35 U.S.C. 154(b) by 0 days.

(21) Appl. No.: 10/203,098
(22) PCT Filed: Feb. 1, 2001
(86) PCT No.: PCT/US01/40003
§ 371 (c)(1), (2), (4) Date: Nov. 20, 2002
(87) PCT Pub. No.: WO01/56788
PCT Pub. Date: Aug. 9, 2001

(65) Prior Publication Data
US 2003/0112502 A1 Jun. 19, 2003

Related U.S. Application Data
(60) Provisional application No. 60/180,055, filed on Feb. 3, 2000.

(51) Int. Cl.[7] .............................. G02F 1/10; G02F 1/13; G06F 17/00
(52) U.S. Cl. ......................... 347/241; 347/256; 359/629
(58) Field of Search ............................... 347/241, 256; 359/618, 629, 639, 245, 246

(56) References Cited

U.S. PATENT DOCUMENTS

| | | | |
|---|---|---|---|
| 4,281,904 A | 8/1981 | Sprague et al. | 350/356 |
| 4,819,018 A | 4/1989 | Moyroud et al. | 354/5 |
| 5,517,359 A | 5/1996 | Gelbart | 359/623 |
| 5,923,475 A | 7/1999 | Kurtz et al. | 359/619 |
| 6,084,626 A | 7/2000 | Ramanujan et al. | 347/239 |
| 6,137,631 A | 10/2000 | Moulin | 359/618 |
| 6,222,666 B1 | 4/2001 | Moulin | 359/246 |
| 6,229,650 B1 * | 5/2001 | Reznichenko et al. | 359/566 |
| 6,369,936 B1 | 4/2002 | Moulin | 359/323 |
| 6,433,934 B1 * | 8/2002 | Reznichenko et al. | 359/622 |

FOREIGN PATENT DOCUMENTS

| | | |
|---|---|---|
| DE | 19918391 | 4/1999 |
| JP | 59101378 | 11/1984 |
| WO | 0049463 | 8/2000 |
| WO | 0156788 | 8/2001 |

* cited by examiner

Primary Examiner—Huan Tran
(74) Attorney, Agent, or Firm—Faegre & Benson LLP

(57) ABSTRACT

This invention relates to an illumination system and method for imaging thermosensitive or light-sensitive media such as printing plate precursors. More particularly, this invention is directed to an illumination system in which laser light is conveyed to a modulator, and the modulated laser light is passed through separating means to permit only the passage of zero order radiant energy which is employed to image the media.

23 Claims, 4 Drawing Sheets

DEVICE FOR EXPOSING THERMOSENSITIVE MEDIA

CROSS-REFERENCE TO RELATED APPLICATIONS

This application is a national phase application of International Application No. PCT/US01/40003, which was filed on Feb. 1, 2001 and which published in English on Aug. 9, 2001, which in turn is converted and claims priority from U.S. provisional application Serial No. 60/180,055, which was filed on Feb. 3, 2000.

BACKGROUND OF THE INVENTION

1. Field of the Invention

This invention relates to an illumination system and method for imaging thermosensitive or light-sensitive media such as printing plate precursors. More particularly, this invention is directed to an illumination system in which laser light is conveyed to a modulator, and the modulated laser light is passed through separating means to permit only the passage of zero order radiant energy which is employed to image the media.

2. Background Information

The present invention concerns the production of images on thermosensitive supports requiring high radiant energy although not as high as the energy required for the ablation of a special coating as described, for example, in copending International Patent Application No. PCT/US01/40002 entitled "HIGH POWER LASER HEAD SYSTEM," incorporated herein by reference.

Systems producing a large number of individual image-forming rays are of considerable interest for speed and performance in flat bed systems in which bands comprised of a large number of pixels are produced by a translating optical projection unit. The present invention makes it possible to transfer to an image receiving media most of the intensity produced by a laser bar having an elongated line of emitters. It combines the use of new commercially available laser sources and a special optical arrangement of components located upstream and downstream of a total internal reflection (TIR) light modulator.

The use of a line of several light sources to illuminate a TIR modulator is not new, as shown for example, in U.S. Pat. No. 4,281,904, which is incorporated herein by reference. In this patent, the image of each source falls on a screen having several portions, as shown in FIG. 6e of this patent, allowing passage of superior diffraction orders and excluding low orders. Another example is described in U.S. Pat. No. 5,517,359, incorporated herein by reference, which discloses the use of lenslets to direct the rays emerging from separate emitters to a modulator.

Additional illumination systems are disclosed in U.S. Pat. No. 6,137,631, U.S. Pat. No. 6,222,666 and U.S. Pat. No. 6,369,936, all of which are incorporated herein by reference.

To increase the effectiveness of a TIR system for applications in which the intensity is more important than contrast, the arrangement in which diffracted rays of zero order are allowed to reach the radiation sensitive media at the exclusion of the others is preferred. The present invention makes it possible to couple to a TIR modulator an elongated source of radiation comprising, for example, a laser bar provided with several laser emitters, regardless of the repartition of these emitters along the bar and their spacing. More specifically, the invention makes it possible to use laser diodes among the most powerful presently available, with a filling factor coefficient "ff" (width of emitters over width of the bar) of over 50%, including for example 60-watt diodes from such suppliers as Opto-Powers, Coherent Technologies and Siemens Corp. The configuration of these diodes, partially because of their high "ff" number, precludes the effective use of microlens arrays, as presently known in the art, to merge emitted beams as will be explained herein.

Therefore, it is an object of the present invention to provide a high power electro-optical modulating system excluding the use of a micro-lens array.

SUMMARY OF THE INVENTION

An optical system for directing the radiant energy produced by a bar of high power laser emitters to a TIR spatial modulator from which selected rays are directed to a media requiring radiation of high radiant intensity comprises:

(a) a plurality of laser radiation sources such as a laser bar having a plurality of emitters;

(b) means for collimating such as a collimating lens for collimating at least a portion of the rays provided by the laser radiation sources;

(c) first imaging means such as a plurality of lenses for providing a first image of the laser radiation sources;

(d) means for collimating such as a collimating lens and means for focusing such as a cylindrical lens for collimating and focusing the rays from the first image;

(e) means for modulating such as a total internal reflection modulator for modulating rays from the first image;

(f) second imaging means such as a plurality of lenses for providing a second image of the modulated rays;

(g) means for separating such as a plate having a slit for separating rays from the diffraction orders of the modulated second image to permit the passage of only zero order rays; and (h) means for imaging such as a plurality of lenses for imaging the zero order rays.

The system may include an optical mixer in the form of a glass blade to direct the radiated rays from the emitters of the laser bar to the modulator.

BRIEF DESCRIPTION OF THE DRAWINGS

FIGS. 1B and 1C graphically show the limitation of the effectiveness of microlenses with an extended laser source.

DETAILED DESCRIPTION OF THE INVENTION

Figure 1A:
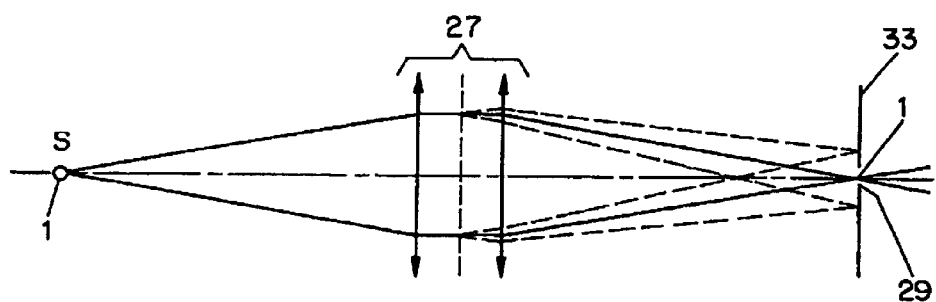
FIGS. 1A and 1B schematically illustrate a simple projection system involving diffracted rays.
Figure 1B:
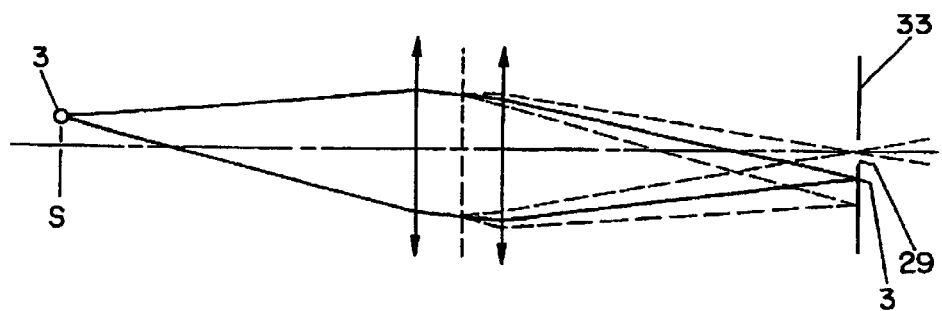

FIGS. 1A and 1B schematically represent the projection system shown in above-mentioned U.S. Pat. No. 4,281,904, incorporated herein by reference. In these figures, a laser source is represented at S, an optical group including a TIR modulator at 27 and a diaphragm also referred to as a Fourier transform plane at 33. The figures clearly show that such a simple arrangement cannot be used in systems using an elongated light source. For example the image of a point located at the edge of an elongated laser source S' (FIG. 1B)

would fall on the blocking screen 33 meant to stop high orders of diffracted rays issued by a point source 1 located on the optical axis and let through zero-order rays.

Figure 1C:
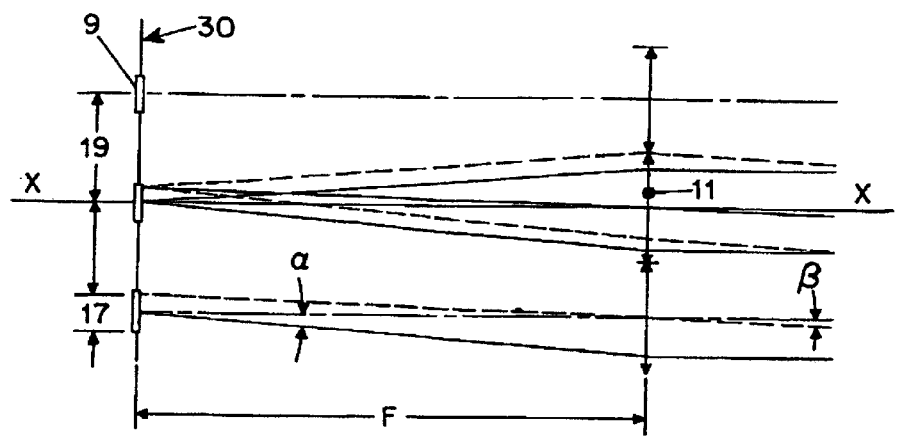
Figure 1D:
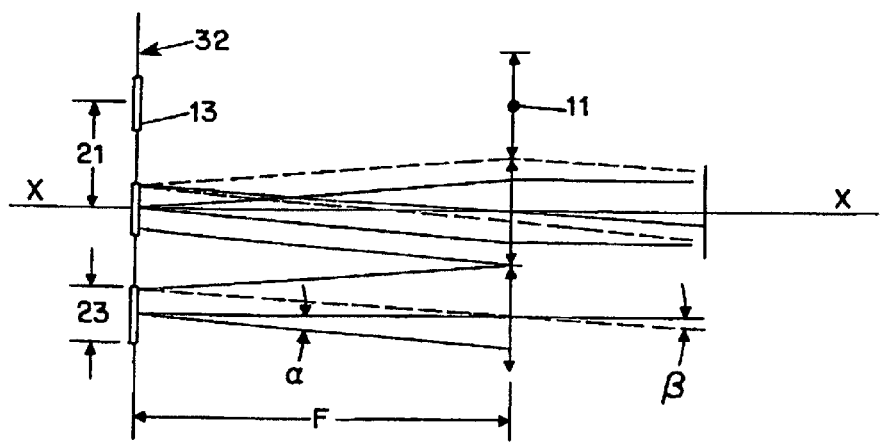

Laser bars having scattered emitters are shown in FIGS. 1C and 1D to illustrate in two examples the use of microlenses for reducing the divergence of the emerging laser rays. As known in the art, for maximum effectiveness, each microlens is preferably located at a distance from the emitters approximately equal to its focal length and at a position where beams from individual emitters start to overlap. This condition determines lens location and focal length of each microlens for a given divergence of rays from emitters.

In FIG. 1C bar 30 has emitters 150 μm wide spaced 500 μm apart (ff=30%) and bar 32 has emitters 250 μm wide, also spaced 500 μm apart (ff=50%). It is also assumed that the divergence of the outputted beams of the emitters is ±4 degrees in the slow axis. This angle determines the position of the microlenses, and accordingly their focal lengths. In the first case (FIG. 1C) where ff=30%, the distance from microlens 11 to the bar 30 is 2,500 μm. In the second case (FIG. 1D) with ff=50%, the distance from microlens 11' to the bar 32 is 1,800 μm. As shown in FIG. 1C, the original rays divergence $\alpha=4$ degrees has been reduced to $\beta=1.72$ degrees thus showing a reduction of divergence of 4/1.72= 2.327%. In the second case (FIG. 1D), where ff=50%, the distance from the lens 11' to the bar 32 is 1,800 μm. The original rays divergence of ±4 degrees has been reduced to $\beta'=3.97$ degrees, a negligible reduction of the divergence, and therefore useless. The above examples demonstrate that beyond an ff number of 50% auxiliary lenses are useless. Thus the use of auxiliary microlenses is precluded with the latest more powerful laser bars with an ff number as high as 90%.

The novel laser head configuration provided by this invention (as exemplified by FIGS. 2–4) will now be described. As shown in the above-identified copending patent applications, all of which are incorporated herein by reference, the invention is applicable to a system based on the use of a modulator, preferably a TIR modulator, associated with controlling electrodes. In such a system, the diffraction of rays entering the modulator is at its maximum when electrodes affecting each pixel exhibit a substantial difference of potential. In this case higher order rays are directed to a stop screen or diaphragm where they are blocked, and no image of sufficient intensity reaches the recording medium (e.g. printing plate precursor). Reversibly, the maximum intensity of radiation reaches the recording medium when no significant difference of potential is exhibited between controlling electrodes.

Figure 2:
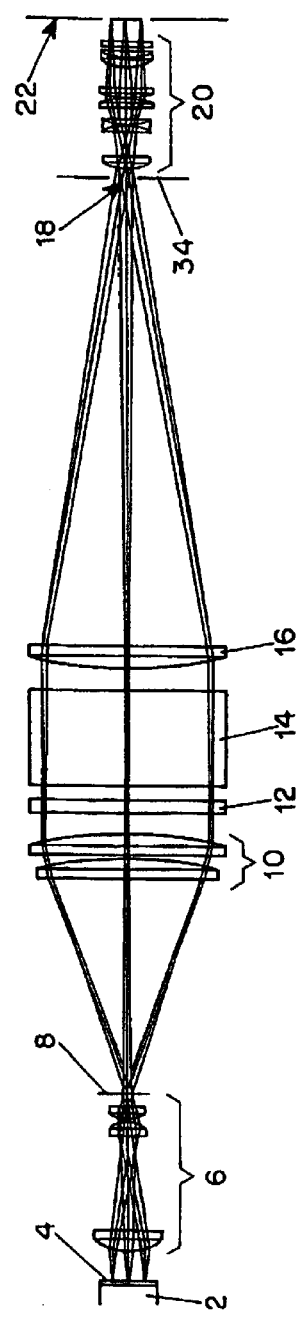
FIG. 2 represents along the "slow" axis plane the optical system used in one embodiment of this invention.
Figure 3:
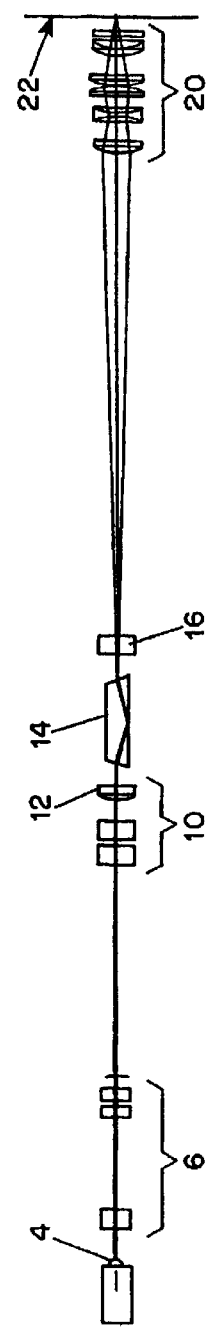
FIG. 3 represents the system of FIG. 2 along the "fast" axis plane.

In the arrangement shown in FIGS. 2 and 3, a cylindrical aspherical lens 4 accurately located in front of laser bar 2 collimates "fast" rays located on a plane perpendicular to the junction plane of the diode laser. The "smil" (representing the deformation of the bar at assembly) of the bar is well within ±1 μm. A telecentric objective 6 comprising several cylindrical lenses makes an image 8 (about three times smaller than the emitting area length of the laser diode), in the plane of the bar 2 which is also the plane of the modulator 14, as shown. A group of two cylindrical lenses 10 having their focal point on the image plane 8 collimate the beams to the modulator 14. A cylindrical lens 12 focalizes the "fast axis" rays on the active zone of the modulator 14. At the output of the collimator 10, a spherical lens 16 reproduces at its focal point a second image, now modulated, of the light source on slit 18 of stop plate 34 whose purpose is to separate diffraction orders. Another objective 20, which comprises a plurality of lenses, forms another modulated image 22 of the internal reflection zone of the modulator 14 and slit 18 superimposed emerging from slit 18 on the recording media. The radiation sensitive support may be radiation sensitive media such as either a flat printing plate as shown in WO 00/49463, incorporated herein by reference, or wrapped around a drum as shown in U.S. Pat. No. 4,819,018, incorporated herein by reference. The zero order rays alone contribute to the formation of this image, the higher order rays being unable to go through slit 18 of stop plate 34.

It will be noted that each emitting point of the laser bar 2 illuminates the entire active surface of the modulator 14, resulting in a good degree of uniformity in the intensity distribution. Any residual non-uniform distribution can be corrected by applying the method described in U.S. patent application Ser. No. 09/524,673.

Figure 4:
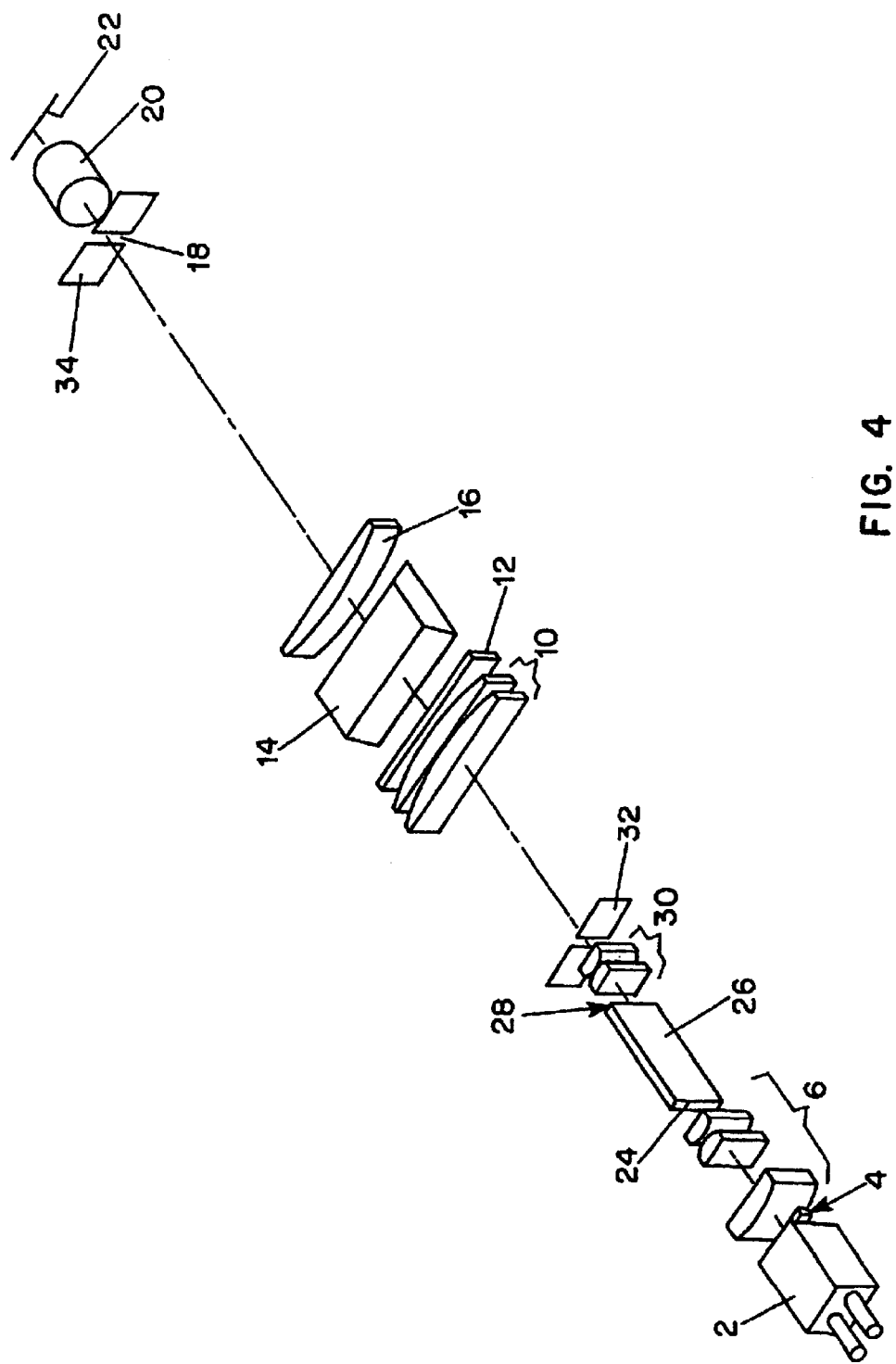
FIG. 4 shows another embodiment of the invention.

FIG. 4 represents the combination of the system as per the present invention with the arrangement and method described in copending U.S. Pat. No. 6,137,631. It is thus possible to make intensity more uniform and to increase efficiency without affecting the collimation efficiency of the beams entering the modulator. In FIG. 4 reference numbers common with reference numbers of FIG. 2 represent the same or equivalent components. As in the previous description in relation with FIGS. 2 and 3, along the slow axis, an image of the emitting width of the laser bar 2 is formed at the input end 24 of glass plate 26. An image of the exit end 28 of the plate is formed on the active zone of the modulator 14 by two cylindrical lenses 30. The focal point of these lenses located on plane 32 is also the focal point of collimating lenses 10. The following components are the same as previously described in relation with FIG. 2.

Although the optical components have been shown aligned along an optical axis it is within the scope of the invention to fold the beams once or several times for the purpose of decreasing the length of the optical assembly for mechanical reasons. Also, the image produced at the output of the system, instead of impinging a sensitive support, can be relayed by other optical means including coherent fiber optics.

The system and method described in U.S. patent application Ser. No. 09/290,829, incorporated herein by reference, makes it possible to use all pixels produced by the laser bar and imaged at the entrance of the modulator without affecting the edges of bands. The system just described can produce bands of 512 pixels of 80 milliwatts, each enabling the rapid insulation of media affected by heat requiring a further chemical process to develop images.

While the invention has been described with reference to its preferred embodiments, it will be understood by those skilled in the art that various changes may be made without departing from the scope of the invention.

What is claimed is:

1. An illumination system comprising:
    (a) a plurality of laser radiation sources;
    (b) means for collimating at least a portion of the rays provided by the laser radiation sources;
    (c) first imaging means for providing a first image of the laser radiation sources;
    (d) means for collimating and means for focusing rays from the first image;
    (e) means for modulating rays from the first image;
    (f) second imaging means for providing a second image of the modulated rays;

(g) means for separating the diffraction orders of rays from the modulated second image to permit the passage of only zero order rays; and (h) means for imaging the zero order rays.

2. The system of claim 1, in which the means for collimating at least a portion of the rays provided by the laser radiation sources comprises a collimating lens.

3. The system of claim 1, in which the first imaging means comprises a plurality of lenses.

4. The system of claim 1, in which the means for collimating rays from the first image comprises a collimating lens.

5. The system of claim 1, in which the means for focusing rays from the first image comprises a cylindrical lens.

6. The system of claim 1, in which the means for modulating comprises a total internal reflection modulator.

7. The system of claim 1, in which the second imaging means comprises a plurality of lenses.

8. The system of claim 1, in which the means for separating comprises a plate having a slit.

9. The system of claim 1, in which the means for imaging the zero order rays comprises a plurality of lenses.

10. An illumination system comprising:

(a) a plurality of laser radiation sources;

(b) a first collimating lens adapted to collimate at least a portion of the rays provided by the plurality of laser radiation sources;

(c) a first lens group adapted to receive the collimated rays and to provide a reduced first image;

(d) a second lens group adapted to collimate and to focus rays from the reduced first image;

(e) a modulator adapted to modulate rays from the first image received from the second lens group;

(f) a third lens group adapted to provide a second image of the modulated rays;

(g) a plate having a slit, wherein the plate is adapted to receive rays from the modulated second image, and the slit is adapted to permit only zero order rays of the modulated second image to pass there through; and (h) a fourth lens group which is adapted to provide an image of the zero order rays.

11. An illumination system comprising:

(a) a plurality of laser radiation sources;

(b) means for collimating at least a portion of the rays provided by the laser radiation sources;

(c) first imaging means for providing an image of the laser radiation sources;

(d) means for transmitting rays from the first image of the collimated rays, the means having an entrance end and exit end;

(e) second imaging means for imaging the exit end of the transmitting means;

(f) means for collimating and means for focusing rays from the first image;

(g) means for modulating rays from the first image;

(h) third imaging means for providing an image of the modulated rays;

(i) means for separating the diffraction orders of rays from the modulated second image to permit the passage of only zero order rays; and (j) means for imaging the zero order rays.

12. The system of claim 11, in which the means for collimating at least a portion of the rays provided by the laser radiation sources comprises a collimating lens.

13. The system of claim 11, in which the first imaging means comprises a plurality of lenses.

14. The system of claim 11, in which the means for transmitting comprises a light transmissive plate.

15. The system of claim 11, in which the second imaging means comprises a plurality of lenses.

16. The system of claim 11, in which the means for collimating rays from the first image comprises a collimating lens.

17. The system of claim 11, in which the means for focusing rays from the first image comprises a cylindrical lens.

18. The system of claim 11, in which the means for modulating comprises a total internal reflection modulator.

19. The system of claim 11, in which the third imaging means comprises a plurality of lenses.

20. The system of claim 11, in which the means for separating comprises a plate having a slit.

21. The system of claim 11, in which the means for imaging the zero order rays comprises a plurality of lenses.

22. An illumination system comprising:

(a) a plurality of laser radiation sources;

(b) a first collimating lens adapted to collimate at least a portion of the rays provided by the plurality of laser radiation sources;

(c) a first lens group adapted to receive the collimated rays and to provide a reduced first image;

(d) a light transmissive plate having entrance and exit ends, wherein the plate is capable of transmitting rays received at the entrance end to the exit end;

(e) a plate lens group adapted to provide an image of the exit end of the transmissive plate;

(f) a second lens group adapted to collimate and to focus rays from the reduced first image received;

(g) a modulator adapted to modulate rays from the first image received from the second lens group;

(h) a third lens group adapted to provide a modulated second image;

(i) a plate having a slit, wherein the plate is adapted to receive rays from the modulated second image and the slit is adapted to permit only zero order rays of the modulated second image to pass there through; and (j) a fourth lens group adapted to provide an image of the zero order rays.

23. A laser printer head comprising:

(a) a laser source;

(b) a first lens group adapted to form on the optical axis of the first lens group a reduced first image of the radiant energy from the laser source;

(c) a second lens group adapted to collimate and to focus rays from the reduced first image;

(d) a modulator adapted to modulate rays from the first image;

(e) a third lens group adapted to form a modulated second image;

(f) a plate having a slit, wherein the plate is adapted to receive rays from the modulated second image and the slit is adapted to permit only zero order rays of the modulated second image to pass therethrough; and (g) a fourth lens group adapted to provide an image of the zero order rays.

* * * * *